United States Patent
Kolender et al.

(10) Patent No.: US 11,785,947 B2
(45) Date of Patent: Oct. 17, 2023

(54) COMPOSITION FOR TREATMENT AND PREVENTION OF LICE

(71) Applicants: Elyse Kolender, Bloomfield Hills, MI (US); Brian Kolender, Bloomfield Hills, MI (US)

(72) Inventors: Elyse Kolender, Bloomfield Hills, MI (US); Brian Kolender, Bloomfield Hills, MI (US)

(*) Notice: Subject to any disclaimer, the term of this patent is extended or adjusted under 35 U.S.C. 154(b) by 485 days.

(21) Appl. No.: 16/405,063

(22) Filed: May 7, 2019

(65) Prior Publication Data

US 2019/0254284 A1 Aug. 22, 2019

Related U.S. Application Data

(62) Division of application No. 15/229,687, filed on Aug. 5, 2016, now abandoned.

(60) Provisional application No. 62/205,932, filed on Aug. 17, 2015.

(51) Int. Cl.
| | |
|---|---|
| *A01N 59/08* | (2006.01) |
| *A01N 65/42* | (2009.01) |
| *A01N 65/22* | (2009.01) |
| *A01N 25/30* | (2006.01) |
| *A01N 25/00* | (2006.01) |
| *A01N 65/00* | (2009.01) |

(52) U.S. Cl.
CPC ............ *A01N 59/08* (2013.01); *A01N 25/00* (2013.01); *A01N 25/30* (2013.01); *A01N 65/00* (2013.01); *A01N 65/22* (2013.01); *A01N 65/42* (2013.01)

(58) Field of Classification Search
CPC ........ A01N 59/08; A01N 25/00; A01N 25/30; A01N 65/00; A01N 65/22; A01N 65/42
See application file for complete search history.

(56) References Cited

U.S. PATENT DOCUMENTS

| 6,607,716 B1 | 8/2003 | Smith et al. |
| 2012/0177751 A1* | 7/2012 | Langley ............... A01N 65/22 424/680 |

OTHER PUBLICATIONS

Anonymous (Loyola Medicine [online]l 2012); downloaded from <URL https://www.newswise.com//articles/they-re-gross-a-parent-s-survival-guide-to-lice > on Jul. 1, 2020; 2 pages. (Year: 2012).*
Anonymous. Peppermint Oil—Respite from Afflictions. Peppermint Essential Oil [online]; 2012; downloaded from <URL http://peppermintessentialoil.com/properties_peppermint-oil-respite-from-afflictions_81.html > on May 7, 2019; 2 pages.

* cited by examiner

*Primary Examiner* — David Browe
(74) *Attorney, Agent, or Firm* — The Dobrusin Law Firm, P.C.

(57) ABSTRACT

A composition and method for treating lice and removing nits from human hair, the composition including an alcohol; an inorganic salt in an amount less than 10 wt %; one or more essential oils and/or plant essences; and purified water. The composition may optionally include a surfactant to reduce separation of the ingredients of the composition and increase the appearance of homogeneity within the composition. The method may include applying the composition to human hair and the scalp and combing the hair to remove the lice and nits.

19 Claims, No Drawings

COMPOSITION FOR TREATMENT AND PREVENTION OF LICE

CLAIM OF PRIORITY

The present application claims the benefit of the filing date of U.S. Patent Application No. 62/205,932, filed Aug. 17, 2015, which is hereby incorporated by reference in its entirety.

FIELD

The teachings relate to a composition and method for treatment of head lice, and more particularly to a composition and method that kills lice, breaks the bond between nits and a hair shaft, and provides easier removal of the lice and nits from the hair.

BACKGROUND

Head lice are parasitic insects that infest a person's head and neck, and the lice feed off of the scalp by drawing small amounts of blood. Each louse can lay about 7 to 10 eggs, also known as nits, every 7 to 10 days on a human scalp, thereby allowing the lice to multiply relatively rapidly. Prior to the nits hatching, there is a strong glue-like bond formed between the shaft of the hair and the egg, which makes it very difficult to separate the nit from the hair and remove the nits.

The presence of head lice often causes discomfort to the host person, as the scalp can become itchy and irritated. Scratching the scalp in an attempt to alleviate the discomfort can then lead to sores, open wounds, scabs, or even infection. Head lice infestations, also known as pediculosis, can quickly spread from one person to another, most commonly by close person-to-person contact, which makes lice (and nits) a large concern within classrooms, childcare centers, camps, families, or other situations where people may be in close quarters or may share grooming items, such as hair brushes.

It is estimated that between six and 12 million children in the United States alone become infested with head lice each year. Consumers, such as concerned and frustrated parents, are often seeking simplified and improved means getting rid of the head lice. Known methods of treatment of the lice-infested hair include using gels, shampoos, conditioners, or other compositions. Many traditional methods include long wait times before the composition can be washed away or removed from the hair, additional scalp irritation, requirements of multiple treatments over several days or weeks, or difficulty in combing out the lice and eggs (e.g., if the treatment is too viscous for a comb to pass through, or if the treatment causes the hair to become tangled).

Some strains of lice are progressively becoming resistant to the active ingredients used in traditional lice treatments, thereby necessitating new treatment methods. Some existing treatment methods may only be partially effective, such as by killing lice but having no impact on the nits or the ability to remove the nits from the hair. Therefore, multiple products are needed, leading to additional toxicity. The need for multiple products and/or steps also contributes to lice becoming resistant to the active ingredients, in large part because the products are often not applied properly and/or all lice and nits are not removed. In addition, consumers are becoming increasingly conscious of the products they are using on themselves and their families, so a simpler composition that is still effective without a long ingredient list of chemicals is desired.

Therefore, there remains a need for a composition and method for the effective treatment of head lice, while reducing treatment times, easing or simplifying treatment (e.g., by reducing the number of products needed or the steps performed), easing removal of the lice and nits, and/or allowing a comb to easily run through the hair being treated.

SUMMARY

The present teachings overcome one or more of the above needs by providing an effective composition and method for treating lice and removing nits from the hair. The present teachings provide a single product treatment that allows for the lice and nits to be removed from the hair. The ability to remove all lice and nits helps to slow the spread of drug-resistant lice and nits, since lice and nits need a human host to survive. If all of the lice and nits are removed, the spread of drug-resistant lice will be reduced, as the lice and nits die before being spread to other (or additional) human hosts.

The composition for the treatment of lice may include an alcohol or alcohol-based product. The alcohol or alcohol-based product may include a single hydroxyl (e.g., may be a primary alcohol such as a C2-C8 alcohol such as propanol, methanol, or isopropanol). The alcohol or alcohol-based product may include benzyl alcohol, for example. The alcohol or alcohol-based product may be present in an amount of about 20 wt % or less, about 10 wt % or less, or about 5 wt % or less (e.g., about 3 wt % to about 5 wt %). The composition may include one or more salts, such as one or more inorganic salts. For example, the inorganic salt may be an alkali metal halide salt, potassium iodide, potassium chloride, or sodium chloride (e.g., USP grade sodium chloride, kosher salt, sea salt, or table salt). The inorganic salt may be present in an amount of about 1 wt % or greater, about 2 wt % or greater, or about 3 wt % or greater. The inorganic salt may be present in an amount of about 20 wt % or less, about 10 wt % or less, or about 9 wt % or less. For example, the inorganic salt may be present in an amount of about 2 wt % to about 8 wt % or about 3 wt % to about 5 wt %. The composition may include one or more essential oils, other plant products or derivatives such as plant essences, or both. The one or more essential oils or other plant products may include peppermint oil, anise oil, aloe vera oil, or a combination thereof. The composition may include a surfactant. The surfactant may reduce separation of the elements of the composition and increase the appearance of homogeneity. The surfactant may be nonionic. The surfactant may be a poloxamer, such as poloxamer 407. The surfactant may be present in an amount of about 5 wt % or less, or preferably about 1 wt % or less. The composition may be water-based (e.g., with about 50 wt % or more being water). The water may be purified water. The composition is preferably of a sufficient viscosity that is it able to be sprayed (e.g., via a hand-pumping or hand-spraying device during application to a person's hair, head, scalp, and/or neck).

An exemplary composition may comprise an alcohol, an inorganic salt, one or more essential oils, a surfactant, and the remainder being water. For example, the composition may comprise an alcohol in an amount of about 3 wt % to about 5 wt %; a salt in an amount of about 3 wt % to about 5 wt %; peppermint oil in an amount of about 3 wt % or less; a poloxamer in an amount of about 1 wt % or less; and the remainder being purified water. The composition may further include a plant derivative or plant essence, such as aloe vera oil. For example, the aloe vera oil may be present in an amount of about 7 wt % or less.

The present teachings further contemplate methods of stunning and/or killing lice, causing detachment of nits from the hair, removing the lice and/or nits from the hair, or a combination thereof. The method of treating lice and nits may include forming the composition as described herein. The composition may be adapted to be applied to human hair and/or the scalp (e.g., by spraying the composition onto the hair and scalp). The composition may be adapted to stun and/or kill lice within minutes (e.g., about 20 minutes or less, about 10 minutes or less, about 5 minutes or less, or even about 2 minutes or less) of contact between the composition and the lice. The composition may be adapted to weaken or break the glue-like bond between nits and the human hair so that the nits can be removed from the hair (e.g., by using a comb). The method may be performed by applying the composition as described herein to the hair, scalp, and/or neck (e.g., by spraying). The composition, when coming in contact with the lice, may kill the lice, thereby allowing them to be removed from the hair and preventing them from laying additional eggs. The composition, when coming in contact in with lice, may stun the lice (e.g., prior to killing the lice), thereby allowing the lice to be removed from the hair. As lice need a human host to survive, being removed from the head will also contribute to the death of the lice so they cannot spread to additional people. The composition, when coming into contact with the nits attached to the hair, may cause the bond between the nits and the hair to loosen, dissolve, or break, thereby allowing the nits to be removed from the hair and preventing them from hatching, as the nits require proximity to the scalp for incubation. The method may further include combing out the lice and nits, such as by using a fine-toothed metal lice comb. Prior to applying the composition, the composition may be shaken or otherwise agitated to distribute any or all ingredients of the composition.

The present teachings also include the method of forming the composition. The method may include adding an alcohol and an inorganic salt to purified water. The adding step may include adding one or more essential oils and/or plant essences to the purified water. The method may include dissolving a surfactant in the water (e.g., purified water). The dissolving step may be performed prior to the adding step. The dissolving step may include refrigerating the surfactant and the water (e.g., purified water). The refrigeration may be performed for about 3 hours or more. The temperature of refrigeration may be between about 1° C. and about 10° C., for example. The method may include adding the alcohol, inorganic salt, the one or more essential oils and/or plant essences, or any combination thereof, to the surfactant dissolved in the purified water. The composition may be agitated for about 5 minutes or more (e.g., to distribute the ingredients within the composition generally evenly).

DETAILED DESCRIPTION

In general, the teachings herein contemplate a composition and method of treating head lice (e.g., by killing the lice and/or allowing the nits to be removed from the hair). The teachings herein contemplate a simplified method of treating lice by providing a user with the ability to kill lice and remove nits from the hair with a single composition. The teachings herein may ease the removal of lice and/or nits from the hair, thereby reducing or preventing the spread of lice, especially drug- or active ingredient-resistant lice, which are becoming an increasing problem.

The composition preferably includes an alcohol or alcohol-based product, an inorganic salt, and water. The composition may also include additives such as one or more essential oils or other plant-derived products (e.g., plant essences), a surfactant to keep the ingredients in the composition in suspension, or combination thereof. It is further contemplated that the composition as described herein is adapted to kill head lice, break the glue-like bond between a nit (louse egg) and the shaft of hair, or both. It is further contemplated that the composition is of a viscosity that allows the composition to be sprayed onto the scalp and hair. The composition may be a liquid solution. For example, the viscosity of the composition may be about 100 cps or less, about 80 cps or less, about 60 cps or less, or even about 40 cps or less, though other higher viscosities are possible. The viscosity may be measured at room temperature (e.g., about 20° C. to about 26° C.). The method of spraying may, for example, be performed using a hand or finger actuated sprayer (e.g., a trigger-type spray nozzle, a perfume atomizer-type nozzle, a spray mist bottle, or the like). The composition may be substantially free of any gel (e.g., about 5% or less by weight or volume). The composition may be entirely free of any gel.

The composition preferably includes an alcohol or alcohol-based product. The alcohol may function to kill, or assist in killing, the head lice. The alcohol or alcohol-based product may stun or slow the lice (e.g., prior to killing the lice), allowing the lice to be removed from the hair (e.g., by using a comb). Alcohol may help to dissolve other additives, such as essential oils, in the formulation (e.g., a water-based formulation) to create a generally homogeneous mixture. Preferably, the alcohol is present in the composition in an amount that is sufficient to kill the lice, yet cause minimal discomfort, such as a burning sensation to the scalp, to the person upon whom the composition is being applied. The alcohol may be present in an amount of about 20 wt % or less, or about 10 wt % or less. The alcohol may be present in an amount of about 1 wt % or greater, or about 2 wt % or greater. For example, the alcohol may be present in an amount of about 3 wt % to about 5 wt %. The alcohol or alcohol-based product may be a primary alcohol (e.g., a C2-C8 alcohol, such as methanol, propanol, or isopropanol). The alcohol or alcohol-based product may be an alcohol having a single hydroxyl group. The alcohol or alcohol-based product may include methyl, ethyl, benzyl alcohol, or pure alcohol, for example. For example, benzyl alcohol (e.g., under the trade name Ulesfia®, by Concordia Pharmaceuticals Inc. in Bridgetown, Barbados) may be used to effectively kill lice upon application to human hair, scalp, and neck. The alcohol or alcohol-based product may have a molecular weight of about 20 g/mol or greater, about 45 g/mol or greater, about 70 g/mol or greater, or about 95 g/mol or greater. The alcohol or alcohol-based product may have a molecular weight of about 200 g/mol or less, about 175 g/mol or less, about 150 g/mol or less, about 125 g/mol or less, or about 100 g/mol or less. For example, the alcohol or alcohol-based product may have a molecular weight between about 95 g/mol and about 125 g/mol.

The composition preferably includes a salt, and more preferably an inorganic salt. The salt may function to break the bond between the nits and the hair (e.g., by loosening, drying out, or dissolving the glue-like substance by which the egg is attached to the human hair). Nits cannot live or hatch without a human host, and nits require warmth of the person's scalp for incubation before they can hatch. Nits dislodged from a hair shaft most likely die before they hatch, so it is desirable to remove the nits as quickly as possible to avoid hatching. The salt may assist in killing or at least stunning the lice. The use of salt may allow for easier combing of the hair, thereby allowing for efficient combing out of nits, reducing treatment time, or both. The salt may be present in the composition in an amount of about 1 wt % or greater, about 2 wt % or greater, or about 3 wt % or greater. The salt may be present in an amount of about 20 wt % or less, about 10 wt % or less, or about 9 wt % or less. For example, the salt may be present in an amount between about 1 wt % and about 20 wt %, between about 2 wt % and about 8 wt %, or even between about 3 wt % and about 5 wt %. The amount of optional surfactant added to the composition may depend upon the amount of salt within the composition. For example, use of lower amounts of salt (e.g., less than about 10 wt %, such as between about 3 wt % and about 5 wt %) may allow for use of less surfactant, as there is less salt to keep in suspension. It may be difficult or more cumbersome to mix higher amounts of salt in solution; therefore, it may be preferred to use lower amounts of salt (e.g., below about 10 wt %, such as between about 3 wt % and about 5 wt %). The salt in the composition may be an alkali metal salt, such as sodium chloride, potassium chloride, potassium iodide, for example, though other salts are possible. The salt may be sea salt, table salt, kosher salt, or USP grade sodium chloride. The amount of salt in the composition may depend upon the type of salt used. For example, USP sodium chloride, which meets United States Pharmacopeia standards, may be effective in smaller amounts, such as between about 3 wt % and about 5 wt %, though greater amounts may also be effective. USP sodium chloride may have improved solubility (e.g., as compared to other salts such as table salt). Table salt, sea salt, or kosher salt, for example may be used instead of, or in addition to, USP sodium chloride.

The composition may include one or more essential oils or plant products (e.g., plant derivatives, plant essences). These essential oils or plant products may function to reduce the amount of irritation (e.g., from the alcohol and/or salt, from the lice, or combination thereof) to the person's scalp, soothe the person's scalp, or both. The oils or essences may provide fragrance to the composition. The oils or essences may function to provide an antiseptic effect upon the scalp, such as to reduce the possibility of infection (e.g., from sores due to excessive scratching of the scalp, an allergic response to louse saliva that is secreted as the lice feed, or both). The oils or essences may function to provide a moisturizing effect on the hair and/or scalp or a smoothing or lubricating effect on the hair (e.g., to ease combing of the hair). The oils or essences may affect the lice, such as by killing the lice, suffocating the lice, or stunning the lice. The oils or essences may help to break down the glue-like bond between the nits and the hair shaft.

Examples of essential oils or plant products or essences that may be used include, but are not limited to, oils such as tea tree, rosemary, peppermint, aloe vera, anise, lavender, ylang-ylang, birch, davana, eucalyptus, moringa, parsley, wintergreen, spearmint, or a combination thereof. The essential oils, plant essences, or other plant products, alone or in combination, may be present in an about of about 0.1 wt % or more, about 0.5 wt % or more, or about 1 wt % or more. The essential oils, plant essences, or other plant products, may be present in an amount of about 15 wt % or less, about 10 wt % or less, or even about 5 wt % or less. The composition may include peppermint oil, for example. Peppermint oil may be present in the composition in an amount of about 0.1 wt % or greater, about 0.5 wt % or greater, or even about 1 wt % or greater. Peppermint oil may be present in the composition in an amount of about 5 wt % or less, about 3 wt % or less, or even about 2 wt % or less. Aloe vera oil may be present in the composition, alone or in addition to any other essential oils or plant essences (e.g., with peppermint oil or with anise oil). The aloe vera oil may be present in the composition in an amount of about 0.1 wt % or greater, about 0.5 wt % or greater, or even about 1 wt % or greater. The aloe vera oil may be present in an about of about 10 wt % or less, about 8 wt % or less, or even about 7 wt % or less. As mentioned, essential oils such as anise oil may be added to the composition, alone or in combination with oils such as peppermint oil or aloe vera oil.

The composition for treating head lice is preferably water-based. The water base may allow for the composition to be of a viscosity that allows the composition to be sprayed onto the scalp (e.g., via a spray bottle having a trigger nozzle, atomizing nozzle, or other type of nozzle). The water base may allow for the ingredients of the composition to be easily mixed, dissolved, or both. The water base may allow for easier removal from the hair or easier cleaning of the hair after the treatment has been concluded. This may be advantageous over traditional products, such as oil-based products which often require harsh detergents to remove the composition itself from the hair post-treatment. The water may be purified water (e.g., purified by a process such as distillation, reverse osmosis, ion exchange, or carbon filtration), spring water, mineral water, or another type of water. The composition may comprise any or all of the ingredients discussed herein, with the remainder being water. The water may be present in the composition in an amount of about 50 wt % or greater, about 70 wt % or greater, or even about 85 wt % or greater.

The composition may optionally include a surfactant. The surfactant may function to keep the oils and salt in suspension. The surfactant may help to give the composition a homogeneous appearance so separation into layers of oil, water, and salt are not immediately noticeable to the eye (e.g., after agitating the composition, such as by shaking). The surfactant may help the salt and oil stay in suspension for about 5 minutes or more (e.g., about 30 minutes) after shaking or otherwise agitating the composition. Maintaining even distribution of the ingredients within the composition for a period of time may be beneficial so that the composition does not have to be continuously shaken during application of the composition to a person's hair, scalp, or neck. The surfactant may help to apply the composition generally evenly. For example, a generally homogeneous composition may help to ensure that the same amount of each ingredient is applied with each spray of the composition onto the person's hair, scalp, and neck to effectively kill the lice and/or break the bond between the nit and the hair. The surfactant may dissolve oily ingredients in the water base of the composition. As noted, the amount of surfactant within the composition may depend upon the amount of salt added to the composition. The surfactant may be present in an amount of about 0.1 wt % or greater, about 0.5 wt % or greater, or even about 1 wt % or greater. The surfactant may be present in an amount of about 5 wt % or less, about 3 wt % or less, or even about 2 wt % or less. The surfactant may be nonionic. The surfactant may be a poloxamer, such as poloxamer 407.

An exemplary composition includes an alcohol, an inorganic salt, one or more essential oils, a surfactant, and the remainder being water. For example, the composition includes an inorganic salt in an amount of about 3 wt % or more; an alcohol in an amount between about 3 wt % and about 5 wt %; an essential oil or other plant product or essence in an amount about 1 wt % or greater; a surfactant in an amount about 1 wt % or greater; and the remainder being purified water. The composition, for example, may have a ratio of alcohol to salt of about 3:1, about 2:1, about 1:1, about 1:2, or about 1:3.

The following compositions are given as illustrative examples and are not intended to limit the scope of the teachings herein. It should be understood that the amounts and ingredients within the examples are not the only amounts and ingredients envisioned by the present teachings. The present teachings contemplate any combination of the ingredients and ranges of amounts as disclosed herein. The values presented in the illustrative examples are in wt %. The following compositions may be applied to a scalp and hair, and then the hair can be combed (e.g., using a metal lice comb having fine-toothed bristles) to remove lice and nits, as well as kill the lice. The amounts of the ingredients are in parts by weight. The compositions may, for example, be packaged into 6 fluid ounce units for use in treating the scalp. One treatment may use about 2 fluid ounces to about 3 fluid ounces, though treatment amounts may vary based upon the length and thickness of the hair being treated.

more, or even about 6 hours or more (e.g., overnight). The other ingredients, such as salt (e.g., sodium chloride), alcohol (e.g., benzyl alcohol), and essential oils and plant essences (e.g., peppermint oil, aloe vera oil, anise oil, or a combination thereof) may be added to the poloxamer and water mixture. Upon adding one or more of the ingredients, the composition may be agitated to disperse the ingredients. Preferably, the composition is agitated for about 2 minutes or more, about 5 minutes or more, or even about 10 minutes or more. The composition may be poured into bottles (e.g., spray bottles). During the filling of the bottles, the composition may be agitated (e.g., about every 15 minutes or less, about every 10 minutes or less, or even about every 5 minutes or less) to help distribute the ingredients evenly in the composition and to help ensure that all bottles of the composition have generally the same amounts of ingredients in each bottle (e.g., within about +/−1%). The filled bottles may be stored at a temperature of about 15° C. to about 30° C. prior to application onto a person's scalp and/or hair.

The present teachings also contemplate a method of killing the lice, separating the nits from the hair (e.g., by loosening the glue-like bond between the nit and the hair, or by breaking the bond). The method of killing the lice includes using the composition as described herein. The

| Ingredient | Example 1 | Example 2 | Example 3 | Example 4 | Example 5 | Example 6 | Example 7 |
|---|---|---|---|---|---|---|---|
| Sodium chloride (USP) | 4 | 4 | | 4 | 4 | 4 | 4 |
| Sodium chloride (table salt) | | | 9 | | | | |
| Benzyl Alcohol | 3 | 4 | 3 | 3 | 4 | | 3 |
| Ethyl alcohol | | | | | | 3 | |
| Peppermint oil | 1 | 1 | 1 | | 2 | 1 | 1 |
| Anise oil | | | | 1 | | | |
| Aloe vera oil | | | | 6 | | | 1 |
| Poloxamer 407 | 1 | 1 | 5 | 1 | 1 | 1 | 1 |
| Purified water | 91 | 90 | 82 | 85 | 89 | 91 | 90 |

It is contemplated that other additives may be present in the composition. Preferably, the additives have little or no impact, or do not have a negative impact, on the efficacy of the composition in killing lice and/or removing nits from the human hair. For example, additives may include dyes (e.g., to provide an aesthetic appearance to the composition in the bottle, without causing discoloration of the hair upon application).

The ingredients as disclosed herein may be mixed together to form the composition. For example, a surfactant (e.g., poloxamer) may first be dissolved into water (e.g., purified water). A poloxamer may be thermo-reversible, thereby dissolving under conditions that are colder than ambient temperature. The poloxamer and water may be refrigerated (or otherwise chilled) to cause the poloxamer to dissolve in water. The poloxamer in water may be exposed to temperatures of about 1° C. or higher, about 1.3° C. or higher, or even about 1.6° C. or higher. The poloxamer in water may be exposed to temperatures of about 10° C. or less, about 7° C. or less, or even about 5° C. or less. The poloxamer in water may be kept in cooler conditions (e.g., refrigeration) for about 1 hour or more, about 3 hours or ingredients of the composition may perform different functions in treating lice. For example, the salt may break or loosen the glue-like bond between the nits and the hair. The alcohol may function to kill the lice. The composition may be applied to the hair, scalp and/or neck of a host person carrying lice and/or nits. Prior to application, it may be necessary to shake the composition or otherwise agitate the composition to distribute the salt, alcohol, oils and any other additives evenly, or generally evenly. The composition may be adapted to be applied by spraying from a bottle or other container holding the composition. For example, when applying, the nozzle may be positioned about 6 inches or less from the scalp (e.g., about 4 inches) and sprayed to saturate the entire scalp and hair. Because lice and nits work close to the scalp, it may be important to completely cover the scalp with the composition, as the lice and nits may need to be contacted by the composition to be effective. To ensure the entire scalp and hair is covered, it may be beneficial to spray the head in sections (e.g., by lifting top sections to spray lower sections or sections near the nape of the neck). Preferably, application is performed on dry hair. About 2 fluid ounces or more may be used to saturate the hair and scalp during each treatment session (e.g., about 2 fluid ounces to about 3 fluid ounces), though more may be needed for longer hair, thicker hair, or both.

The method may further include combing out the lice and nits. As the composition begins to kill lice on contact, the lice may be dead prior to the combing step. The combing step is preferably performed using a comb, such as a fine-toothed metal lice comb, while the hair (or that particular section of hair) is saturated with the composition. To remove the nits and lice from the comb, the comb may be wiped off between each pass through the hair (e.g., wiping on a wet paper towel, towel, or other material capable of wiping off the comb). The combing step may be performed immediately upon saturation of the hair and scalp with the composition. Therefore, it may not be necessary (though not harmful) to let the composition sit on the hair for any length of time prior to combing, unlike other traditional methods. Live lice are stunned or killed in about 20 minutes or less, about 10 minutes or less, about 5 minutes or less, or even about 2 minutes or less after contact with the composition. After the application of the composition, it is contemplated that the lice can be removed immediately once the combing step begins. The combing step (e.g., combing the entire head and scalp) may take about 120 minutes or less, or even about 60 minutes or less (e.g., about 45 minutes), depending upon the length and thickness of the hair.

While the discussion of the present teachings discuss a composition of sufficient viscosity that it can be applied as a spray, it is also contemplated that the composition may be in alternate forms, such as gels, creams, shampoos, conditioners, serums, and the like. These alternate forms may have a different base substance (e.g., rather than a water base). One or more essential oils or other plant products may then be added to the base (e.g., tea tree, rosemary, peppermint). The base may serve to suffocate the lice, thereby killing the lice. The nits may be combed out using a metal lice comb.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods. Alternate expressions of percent by weight (or wt %) also envision parts by weight. Expressions of parts by weight also envision percent by weight (or wt %), for example.

It will be appreciated that the above is by way of illustration only. Other ingredients may be employed in any of the compositions disclosed herein, as desired, to achieve the desired resulting characteristics. Examples of other ingredients that may be employed include antibiotics, anesthetics, antihistamines, preservatives, surfactants, antioxidants, unconjugated bile acids, mold inhibitors, nucleic acids, pH adjusters, osmolarity adjusters, or any combination thereof.

What is claimed is:

1. A method for treating lice and nits comprising:
forming a composition for treatment of lice and nits, the forming step comprising adding alcohol, an inorganic salt in an amount less than 10 wt %, and one or more essential oils and/or plant essences to purified water, where the purified water is present in an amount of about 50 wt % or more than 50 wt %;
applying the composition to dry human hair and a scalp by spraying;
stunning or killing lice within about 5 minutes or less of the applying step, the stunning or killing lice being a result of contact between the composition and the lice from the applying step;
weakening or breaking a glue-like bond between nits and the human hair so that the nits can be removed from the hair, the weakening or breaking the glue-like bond being a result of contact between the composition and the nits from the applying step; and
following the weakening or breaking step, combing the hair for separating the nits from the hair.

2. The method of claim 1, wherein the alcohol is a primary alcohol, benzyl alcohol, or a combination thereof.

3. The method of claim 1, wherein the inorganic salt is sodium chloride.

4. The method of claim 1, wherein the one or more essential oils and/or plant essences include peppermint oil in an amount of about 1 wt % to about 3 wt %.

5. The method of claim 1, wherein the forming step includes adding a plant essence, and wherein the plant essence is aloe vera oil.

6. The method of claim 1, wherein the alcohol is added in an amount of about 3 wt % to about 5 wt %.

7. The method of claim 1, wherein the inorganic salt is added in an amount of about 3 wt % to less than 10 wt %.

8. The method of claim 7, wherein the inorganic salt is added in an amount of about 3 wt % to about 5 wt %.

9. The method of claim 1, wherein the composition is a liquid solution having a viscosity of about 100 cps or less at room temperature.

10. The method of claim 1, wherein the composition consists essentially of:
a. the alcohol in an amount of about 3 wt % to about 5 wt %;
b. the inorganic salt in an amount of about 3 wt % to about 5 wt %;
c. peppermint oil in an amount of about 3 wt % or less;
d. a poloxamer in an amount of about 1 wt % or less; and
e. purified water.

11. The method of claim 10, wherein the alcohol is a primary alcohol, benzyl alcohol, or a combination thereof, and wherein the inorganic salt is sodium chloride.

12. The method of claim 1, wherein the forming step includes dissolving a surfactant in purified water prior to the step of adding alcohol, inorganic salt and one or more essential oils and/or plant essences, and wherein the dissolving includes refrigerating the surfactant and the purified water for about 3 hours or more than 3 hours.

13. The method of claim 12, wherein the surfactant is a poloxamer.

14. The method of claim 1, wherein the step of combing the hair is performed as soon as saturation occurs after the step of applying the composition.

15. The method of claim 1, wherein the applying the composition includes saturating the hair and scalp with about 2 fluid ounces or at least 2 fluid ounces of the composition; and the step of combing the hair is performed as soon as saturation occurs after the applying step.

16. A method for treating lice and nits comprising:
forming a composition for treatment of lice and nits, wherein the composition consists essentially of:
a. benzyl alcohol in an amount of about 3 wt % to about 5 wt %;
b. sodium chloride in an amount of about 3 wt % to about 5 wt %;
c. peppermint oil in an amount of greater than 0 wt % up to about 3 wt %;
d. a poloxamer in an amount of greater than 0 wt % up to about 1 wt %; and
e. purified water; and
applying the composition to dry human hair and a scalp via a spray nozzle without lathering;
stunning or killing lice within about 5 minutes or less of the applying step, the stunning or killing lice being a result of contact between the composition and the lice from the applying step;
weakening or breaking a glue-like bond between nits and the human hair so that the nits can be removed from the hair, the weakening or breaking the glue-like bond being a result of contact between the composition and the nits from the applying step; and
following the weakening or breaking step, combing the hair for separating the nits from the hair.

17. A method for treating lice and nits comprising:
mixing a composition for treatment of lice and nits, wherein the composition is a liquid solution having a viscosity of about 100 cps or less at room temperature that consists essentially of:
a. benzyl alcohol in an amount of about 3 wt % to about 5 wt %;
b. sodium chloride in an amount of about 3 wt % to about 5 wt %;
c. peppermint oil in an amount of greater than 0 wt % up to about 3 wt %;
d. a poloxamer in an amount of greater than 0 wt % up to about 1 wt %; and
e. purified water; and
applying the composition to dry human hair and a scalp via a spray nozzle without lathering;
stunning or killing lice within about 5 minutes or less of the applying step, the stunning or killing lice being a result of contact between the composition and the lice from the applying step;
weakening or breaking a glue-like bond between nits and the human hair so that the nits can be removed from the hair, the weakening or breaking the glue-like bond being a result of contact between the composition and the nits from the applying step; and
combing the human hair for removing the lice and nits from the hair.

18. The method of claim 16, wherein the applying the composition includes saturating the hair and scalp with about 2 fluid ounces or at least 2 fluid ounces of the composition; and
wherein the step of combing the hair is performed as soon as saturation occurs after the applying the composition.

19. The method of claim 17, wherein the applying the composition includes saturating the hair and scalp with about 2 fluid ounces or at least 2 fluid ounces of the composition; and wherein the combing the hair is performed as soon as saturation occurs after the applying the composition.

\* \* \* \* \*